_(12)_ United States Patent
Zipplies et al.

US007041728B2

(10) Patent No.: US 7,041,728 B2
(45) Date of Patent: May 9, 2006

(54) AQUEOUS DISPERSIONS OF POLYTETRAFLUOROETHYLENE HAVING A LOW AMOUNT OF FLUORINATED SURFACTANT

(75) Inventors: Tilman Zipplies, Burghausen (DE); Klaus Hintzer, Kastl (DE); Michael C. Dadalas, Eggenfeldden (DE); Gernot Loehr, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/962,633

(22) Filed: Oct. 12, 2004

(65) Prior Publication Data

US 2005/0107518 A1    May 19, 2005

(30) Foreign Application Priority Data

Nov. 17, 2003    (EP)    ................... 03078598

(51) Int. Cl.
  *C08L 27/12*    (2006.01)
  *D06M 15/277*    (2006.01)
(52) U.S. Cl. .................. 524/544; 524/545; 526/242; 526/250
(58) Field of Classification Search ............ 526/250, 526/242; 524/544, 545
  See application file for complete search history.

(56) References Cited

U.S. PATENT DOCUMENTS

| | | | |
|---|---|---|---|
| 2,037,953 | A | 4/1936 | Watson et al. |
| 2,434,058 | A | 1/1948 | Stenzel |
| 2,965,595 | A | 12/1960 | Brinker et al. |
| 3,037,953 | A | 6/1962 | Marks et al. |
| 3,142,665 | A | 7/1964 | Cardinal et al. |
| 3,489,595 | A | 1/1970 | Brown, Jr. |
| 4,029,868 | A | 6/1977 | Carlson |
| 4,112,211 | A | 9/1978 | Kuhls et al. |
| 4,282,162 | A * | 8/1981 | Kuhls .................. 554/193 |
| 4,369,266 | A | 1/1983 | Kuhls et al. |
| 4,391,940 | A | 7/1983 | Kuhls et al. |
| 4,439,385 | A | 3/1984 | Kuhls et al. |
| 4,864,006 | A * | 9/1989 | Giannetti et al. ........... 526/209 |
| 5,229,480 | A | 7/1993 | Uschold |
| 5,285,002 | A * | 2/1994 | Grootaert .................. 526/222 |
| 5,576,381 | A | 11/1996 | Bladel et al. |
| 5,688,884 | A | 11/1997 | Baker et al. |
| 5,700,859 | A | 12/1997 | Ogura et al. |
| 5,763,552 | A | 6/1998 | Feiring et al. |
| 5,804,650 | A | 9/1998 | Tsuda et al. |
| 5,895,799 | A | 4/1999 | Wu et al. |
| 5,973,091 | A * | 10/1999 | Schmiegel .................. 526/247 |
| 6,025,307 | A | 2/2000 | Chittofrati et al. |
| 6,103,843 | A | 8/2000 | Abusleme et al. |
| 6,126,849 | A | 10/2000 | Yamana et al. |
| 6,566,452 | B1 | 5/2003 | Blädel et al. |
| 6,642,307 | B1 * | 11/2003 | Sogabe et al. .............. 524/805 |
| 6,825,250 | B1 * | 11/2004 | Epsch et al. ................. 523/310 |

FOREIGN PATENT DOCUMENTS

| | | |
|---|---|---|
| CA | 2 354 138 A1 | 6/2000 |
| EP | 0 022 257 | 1/1981 |
| EP | 0 481 509 | 4/1992 |
| EP | 0 525 660 | 2/1993 |
| EP | 0 648 787 A1 | 4/1995 |
| EP | 0 712 882 | 5/1996 |
| EP | 0 752 432 | 1/1997 |
| EP | 0 816 397 | 1/1998 |
| EP | 0 818 506 | 1/1998 |
| EP | 0 969 055 | 1/2000 |
| EP | 1 059 342 | 12/2000 |
| GB | 642 025 | 8/1950 |
| WO | WO 94/14904 | 7/1994 |
| WO | WO 98/46658 | 10/1998 |
| WO | WO 00/71590 | 11/2000 |
| WO | WO 02/072653 | 9/2002 |
| WO | WO 02/78862 | 10/2002 |
| WO | WO 03/020836 | 3/2003 |

OTHER PUBLICATIONS

*Fluoroplastics*, vol. 1, "Non-Melt Processible Fluoroplastics", p. 168-184, Sina Ebnesajjad, Plastics Design Library, Norwich, NY 2000.

* cited by examiner

*Primary Examiner*—David W. Wu
*Assistant Examiner*—Henry S. Hu
(74) *Attorney, Agent, or Firm*—Brian E. Szymanski

(57) ABSTRACT

The present invention provides a method of making an aqueous dispersion of non-melt processible polytetrafluoroethylene, the method comprising:

(a) an aqueous emulsion polymerization of an amount of tetrafluoroethylene to produce a final amount of polytetrafluoroethylene solids and optionally up to 1% by weight based on the amount of tetrafluoroethylene of a perfluorinated comonomer, wherein said aqueous emulsion polymerization is initiated with a free radical initiator and the polymerization is carried out in the presence of a fluorinated surfactant, and wherein before completing the feeding of said amount of tetrafluoroethylene but after feeding at least 80% by weight of said amount of tetrafluoroethylene, free radicals capable of introducing ionic end groups or precursors thereof in the polytetrafluoroethylene polymer are caused to be formed at a rate that without counter measures would cause an increase in the polymerization rate of at least 20%;

(b) reducing the amount of fluorinated surfactant in the thus obtained aqueous dispersion to an amount of not more than 200 ppm, preferably not more than 100 ppm and more preferably not more than 50 ppm based on the amount of polytetrafluoroethylene solids. The invention further provides an aqueous dispersion of polytetrafluoroethylene particles and the use thereof in coating a substrate.

9 Claims, No Drawings

US 7,041,728 B2

AQUEOUS DISPERSIONS OF POLYTETRAFLUOROETHYLENE HAVING A LOW AMOUNT OF FLUORINATED SURFACTANT

This application claims priority from European Patent Application Serial No. 03078598.4, filed Nov. 17, 2003.

TECHNICAL FIELD

The present invention relates to aqueous dispersions of polytetrafluoroethylene that have a low amount of fluorinated surfactant. The present invention also relates to a method of making such aqueous dispersions.

BACKGROUND

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

In particular PTFE dispersions have found wide applications because of the unique and desirable chemical and physical properties of PTFE. For example, PTFE dispersions are frequently used in preparing coating compositions for coating metal substrates such as cookware because of the high temperature resistance of PTFE and anti-stick properties. The chemical resistance and corrosion resistance of PTFE have been exploited in industrial applications such as in chemical manufacturing plants. Because of its unrivalled weathering stability, PTFE has further been used for coating woven glass cloth for architectural fabrics. Details on fabrication and processing of PTFE-dispersions can be found in Fluoroplastics, Vol. 1, "Non-melt processible fluoroplastics", p. 168–184, Sina Ebnesajjad, Plastics Design Library, Norwich, N.Y. 13815, publ. 2000.

Aqueous dispersions of PTFE are typically obtained by aqueous emulsion polymerization. The aqueous emulsion polymerization is typically carried out in the presence of a non-telogenic fluorinated surfactant. Frequently used fluorinated surfactants include perfluorooctanoic acids and salts thereof, in particular ammonium perfluorooctanoic acid. Further fluorinated surfactants used include perfluoropolyether surfactants such as disclosed in EP 1059342, EP 712882, EP 752432, EP 816397, U.S. Pat. Nos. 6,025,307, 6,103,843 and 6,126,849. Still further surfactants that have been used are disclosed in U.S. Pat. Nos. 5,229,480, 5,763,552, 5,688,884, 5,700,859, 5,804,650, 5,895,799, WO 00/22002 and WO 00/71590. The aqueous emulsion polymerization method to produce PTFE is well known and is described in for example U.S. Pat. Nos. 2,434,058, 2,965,595, DE 25 23 570 and EP 030 663.

Aqueous emulsion polymerization of TFE is also used at industrial scale for making fine resin powders, so called paste ware. For making fine resin powders, core-shell polymerization is widely used to achieve certain properties of the resin powders and end-use properties of articles made thereof. Generally speaking, core-shell polymerization produces very high molecular weight polymer in the shell and significantly lower molecular weights in the core of the resin powder particles.

Core-shell polymerization of PTFE has also been described to improve certain properties of PTFE. For example, core-shell polymerization of PTFE is described in U.S. Pat. Nos. 2,965,595, 3,142,665 and EP 525 660. EP 481 509 discloses a core shell polymerization to obtain PTFE that has good blending and dispersing properties in a resin, an elastomer or a paint. It is taught in this patent that the shell of the PTFE particles should have a molecular weight of about 10,000 to 800,000 g/mol. A chain transfer agent is typically used to achieve the low molecular weight in the shell of the core shell particles.

WO 02/072653 teaches core shell PTFE dispersions that contain at least 1.5% by weight of rod-shaped PTFE particles that have a length to diameter ratio of at least 5. The majority of PTFE particles in the dispersion are cylindrical, i.e., having a length to diameter ratio of 1.5 or more. It is taught that such dispersions have an enhanced shear stability combined with a high critical cracking thickness. However, to produce non-spherical particles the polymerization conditions need to be carefully controlled. Moreover, WO 02/072653 teaches the use of a telogenic agent during the last stage of the polymerization, which will result in producing a substantial amount of very low molecular weight PTFE and which might potentially compromise the desirable properties of PTFE.

Following the aqueous emulsion polymerization, the obtained dispersion is generally further upconcentrated to yield the desired fluoropolymer solids, which is typically between 40 and 70% by weight. Methods of upconcentration include for example thermal upconcentration, ultrafiltration as disclosed in U.S. Pat. No. 4,369,266 and decantation as disclosed in U.S. Pat. No. 2,037,953. Generally, the dispersions are upconcentrated in the presence of a stabilizing surfactant such as a non-ionic surfactant.

Because of some environmental concerns that have been raised against the presence of the fluorinated surfactants typically used in the aqueous emulsion polymerization and because such surfactants are fairly expensive, methods have been developed to remove and recover the fluorinated surfactant from aqueous fluoropolymer dispersions, including PTFE dispersions. A particularly effective method for recovering fluorinated surfactants from a PTFE dispersion has been disclosed in WO 00/35971. This method involves contacting the fluoropolymer dispersion with an anion exchanger whereby the fluorinated surfactant binds to the anion exchange resin and is thus effectively removed from the aqueous dispersion. The fluorinated surfactant will generally bond to the anion exchange resin as a result of physical adsorption and to the ion exchange sites where it will replace the anions of the resin. Typically, this method achieves a residual amount of fluorinated surfactant of not more than 100 ppm and frequently not more than 50 ppm of fluorinated surfactant based on the weight of fluoropolymer solids.

In many applications, the PTFE dispersion resulting after polymerization and upconcentration are combined with further additives or components to produce a final composition. For example, in metal coating, in particular for coating cookware, the final composition may be obtained by further blending heat resistant polymers such as polyamide imide, polyimide or polyarylen sulphide with the PTFE dispersion.

Still further ingredients such as pigments and mica particles may be added as well to obtain the final coating composition for coating metal. Such additional components are typically dispersed in organic solvents such as toluene, xylene or N-methylpyrrolidone. The fluoropolymer dispersions typically represent about 10 to 80% by weight of the final composition. Coating compositions for metal coatings and components used therein have been described in e.g. WO 02/78862, WO 94/14904, EP 22257 and U.S. Pat. No. 3,489,595.

It has now been found that when PTFE dispersions having no or little fluorinated surfactant, are used to prepare final coating compositions as for example described above, coagulation may occur during preparation of the final coating composition, in particular when the level of fluorinated surfactant is very low. Also, problems may arise in the application of the final coating composition to a substrate such as for example a metal substrate for cookware. For example, when spraying such a coating die clogging occurred after some time. Furthermore, coagulation occurred in the pumping system, pumping the dispersion to a coating station for coating for example glass fabrics. Still further, coagulation in the dispersion may occur when excess coating composition is removed by doctor blades.

Thus, notwithstanding the excellent storage stability of aqueous PTFE dispersions from which the fluorinated surfactant has been removed, such dispersions present coagulation problems in the preparation and/or application of the final coating compositions in which they are combined with further coating ingredients.

Accordingly, it is desirable to overcome or at least to reduce the aforementioned problems. Desirably, the aforementioned problems are reduced or resolved without impairing or substantially impairing the good mechanical and physical properties of PTFE and coatings produced therewith. Preferably the solution should be easy and convenient and should be cost effective and environmentally friendly.

Disclosure

In accordance with the present invention there is provided an aqueous non-melt processible polytetrafluoroethylene dispersion comprising non-melt processible polytetrafluoroethylene particles in an amount of 30 to 70% by weight and an amount of non-ionic surfactant between 2 and 15% by weight, preferably 3 to 12% by weight based on the weight of polytetrafluoroethylene solids, wherein the dispersion is free of fluorinated surfactant or contains fluorinated surfactant in amounts of not more than 200 ppm based on the amount of polytetrafluoroethylene solids. At least part of the non-melt processible polytetrafluoroethylene particles comprise an effective amount of ionic end groups in the polytetrafluoroethylene polymer chains such that an aqueous dispersion thereof having the following composition:
58% by weight of the non-melt processible polytetrafluoroethylene particles having said effective amount of ionic end groups;
an amount of 5% by weight based on the total weight of solids of non-ionic surfactant consisting of polyethylene glycol mono [4-(1,1,3,3-tetramethylbutyl)phenyl]ether having an average of 9–10 ethylene oxide groups (available as TRITON™ X-100);
less than 100 ppm of fluorinated surfactant;
and having a conductivity of at least 500 µS/cm;

has a shear stability of at least 3 minutes, preferably at least 4 minutes when the average particle diameter of the polytetrafluoroethylene particles is 150 nm or more, or a shear stability of at least 4 minutes, preferably at least 5 minutes when the particle size is less than 150 nm and wherein the shear stability is measured by stirring 150 g of the aqueous dispersion with 2 g of xylol at a temperature of 20° C. and a stirring rate of 8000 rpm.

By the term "non-melt processible polytetrafluoroethylene" is meant that the melt viscosity of the polytetrafluoroethylene is so high that conventional melt processing equipment cannot be used to process the polytetrafluoroethylene. This means in general that the melt viscosity is $>10^{10}$ Pa·s. The aqueous dispersions according to the invention can offer such advantages as being more environmentally friendly because of a low amount of fluorinated surfactant combined with less problems of coagulation during preparation and/or application of a final coating composition in which the dispersions are combined with further components and in particular organic solvents. The dispersions may be conveniently and cost effectively produced.

Thus, the present invention in a further aspect provides a method of making an aqueous dispersion of non-melt processible polytetrafluoroethylene, the method comprising:

(a) an aqueous emulsion polymerization of an amount of tetrafluoroethylene to produce a final amount of polytetrafluoroethylene solids and optionally up to 1% by weight based on the amount of tetrafluoroethylene of a perfluorinated comonomer, wherein said aqueous emulsion polymerization is initiated with a free radical initiator and the polymerization is carried out in the presence of a fluorinated surfactant, and wherein before completing the feeding of said amount of tetrafluoroethylene but after feeding at least 80% by weight of said amount of tetrafluoroethylene, free radicals capable of introducing ionic end groups or precursors thereof in the polytetrafluoroethylene polymer are caused to be formed at a rate that without counter measures would cause an increase in the polymerization rate of at least 20%;

(b) reducing the amount of fluorinated surfactant in the thus obtained aqueous dispersion to an amount of not more than 200 ppm, preferably not more than 100 ppm and more preferably not more than 50 ppm based on the amount of polytetrafluoroethylene solids.

Polymerization Process

The aqueous dispersions of PTFE are produced using an aqueous emulsion polymerization of TFE. PTFE produced in accordance with the present invention includes modified PTFE and accordingly, the polymerization may optionally involve the use of a perfluorinated comonomer such as, for example, a perfluorinated vinyl ether or a perfluorinated $C_3$–$C_8$ olefin such as for example hexafluoropropylene. The term 'perfluorinated monomer' as used in connection with the present invention not only includes monomers consisting of carbon and fluorine atoms but also includes monomers in which some of the fluorine atoms are replaced by chlorine or bromine such as for example in chlorotrifluoroethylene. Nevertheless, a perfluorinated monomer in connection with the invention should not have hydrogen atoms in the molecule. The amount of such optional comonomer(s) should generally not exceed 1%, the resulting PTFE will likely be melt processible and would no longer conform to the ISO 12068 standard defining non-melt processible PTFE.

The aqueous emulsion polymerization is carried out in the presence of a fluorinated surfactant. An effective amount of fluorinated surfactant should typically be used to sufficiently stabilize the PTFE particles and to obtain a desired particle size of the PTFE particles. The amount of fluorinated surfactant is generally between 0.03 and 1%, preferably between 0.08 and 0.5% by weight relative to the amount of water used in the aqueous emulsion polymerization.

Any of the fluorinated surfactants known or suitable for use in aqueous emulsion polymerization of fluorinated monomers can be used. Particularly suitable fluorinated surfactants are typically anionic fluorinated surfactants that are non-telogenic and include those that correspond to the formula:

$$Q\text{-}R_f\text{-}Z\text{-}M^a \qquad (I)$$

wherein Q represents hydrogen, Cl or F whereby Q may be present in terminal position or not; $R_f$ represents a linear or branched perfluorinated alkylene having 4 to 15 carbon atoms; Z represents $COO^-$ or $SO_3^-$, $M^a$ represents a cation including an alkali metal ion or an ammonium ion.

Representative examples of emulsifiers according to above formula (I) are perfluoroalkanoic acids and salts thereof such as perfluorooctanoic acid and its salts in particular ammonium salts.

Further fluorinated surfactants that may be used include perfluoropolyether surfactants such as disclosed in EP 1059342, EP 712882, EP 752432, EP 816397, U.S. Pat. Nos. 6,025,307, 6,103,843 and 6,126,849. Still further surfactants that have been used are disclosed in U.S. Pat. Nos. 5,229,480, 5,763,552, 5,688,884, 5,700,859, 5,804,650 5,895,799, WO 00/22002 and WO 00/71590.

The aqueous emulsion polymerization of TFE is initiated with a free radical initiator. Any of the known or suitable initiators for initiating an aqueous emulsion polymerization of TFE can be used. Suitable initiators include organic as well as inorganic initiators although the latter are generally preferred. Examples of inorganic initiators that can be used include for example ammonium, alkali, or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (available as Rongalite® from BASF Co., Ludwigshafen, Germany) or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. Generally, when manganic or permanganic based initiators are used, the manganic ions may be removed subsequent to the polymerization by contacting the resulting dispersion with a cation exchange resin.

The polymerization will typically be conducted at a temperature of 10 to 100° C., preferably between 20° C. and 90° C. and at a pressure of 4 to 30 bar, preferably 10 to 25 bar. The aqueous emulsion polymerization system may further comprise auxiliaries, such as buffers, complex-formers and gas carriers. The polymerization of TFE is strongly mass transfer controlled and accordingly, the polymerization rate strongly depends on agitation conditions. TFE is quicker consumed via polymerization than it is replenished in the aqueous phase from the gaseous phase (head-space). To mitigate this difficulty, the polymerization may be carried out in presence of a gas carrier. This is typically an organic liquid immiscible with water that has a substantially higher solubility for TFE in comparison with water. Suitable gas carriers are e.g. paraffin wax that is liquid under the polymerization conditions as described e.g., WO 02/072653 A2 or a Freon such as R113. The amount of the gas carrier is typically about 10% by volume of the aqueous phase.

In a particular embodiment, a seeded polymerization may be used. That is, the polymerization is initiated in the presence of small particles of fluoropolymer, typically small PTFE particles having a volume average diameter of between 50 and 100 nm. Such seed particles are produced in a separate aqueous emulsion polymerization and may be used in an amount of 20 to 50% by weight based on the weight of water in the aqueous emulsion polymerization. The use of seed particles allows better control over the PTFE particle size that is desired and avoids formation of coagulum during polymerization, which could cause explosion during the polymerization. Also, it is generally preferred that the polymerization conditions are elected such that the particles produced are generally spherical, that is the ratio of the largest to the smallest of two principal orthogonal dimensions of the particles is less than 1.5 and preferably is between 1 and 1.3. Accordingly, the polymerization should be carried out without taking special measures, e.g. as disclosed in WO 02/072653, to cause non-spherical particles such as rods or cylindrical particles to form and thus at least 90% by weight and more preferably at least 99% by weight of the PTFE particles produced will be spherical. Spherical particles can conveniently be obtained by starting the polymerization in presence of small amounts of HFP or perfluoro alkyl vinylethers.

The amount of polymer solids that can be obtained at the end of the polymerization is typically between 10% and 35% by weight, preferably between 20% and 30% by weight and the average particle size (volume average diameter) of the resulting fluoropolymer is typically between 50 nm and 350 nm, for example between 100 and 300 nm. PTFE dispersions of small particles generally provide more stable dispersions, have lower settling rates and generally may provide better film forming properties.

In accordance with the present invention, at the final stage of the emulsion polymerization, free radicals capable of introducing ionic end groups or precursors thereof in the polytetrafluoroethylene polymer are caused to be formed at a rate that without counter measures would cause an increase in the polymerization rate of at least 20%, preferably at least 25%, more preferably at least 35% and most preferably at least 40%. Without intending to be bound by any theory, it is believed that an increased amount (relative to an unmodified polymerization run) of ionic end groups and/or precursors thereof is formed in the PTFE polymer. It is believed that these ionic groups (and precursors thereof when converted to the corresponding ionic group) are substantially present at the surface of the PTFE particles and even after reducing the level of fluorinated surfactant of the dispersion later on, continue to stabilize the particles such that a high shear stability is achieved when such dispersion is blended with further components to produce a final coating composition as described above.

By 'final polymerization stage' is meant the stage at which at least 80%, preferably at least 85% and more preferably at least 90% by weight of the total amount of TFE to produce a final amount of PTFE, has been fed to the polymerization. By 'final amount of PTFE' is meant the amount of PTFE solids obtained at the end of the polymerization. When a seeded polymerization using PTFE particles is used, the final polymerization stage is determined relative to the total amount of TFE fed to the seeded polymerization without accounting for the amount of TFE used to produce the seed particles. Generally, the shorter the final polymerization stage, the lower the amount of lower molecular weight PTFE that may form will be. But, generally when the final polymerization stage is shorter, it may be desirable to use a larger increase in the polymerization rate to achieve an effective amount of ionic end groups. Thus, when the final polymerization stage starts when at least 90% by weight of the total amount of TFE has been fed to the polymerization, it will then generally be preferred to effect a polymerization rate increase (absent counter measures) of at least 35%, preferably at least 40% whereas with the final polymerization stage starting at 80% by weight of the total amount of TFE having been fed to the polymerization, the polymerization rate increase may not need to be more than 20 or 25%.

By the increase in polymerization rate absent counter measures is meant the polymerization rate increase determined from the relative increase in the polymerization rate between the average polymerization rate in the polymerization stage during which 10% by weight of the total amount of TFE is being converted and which immediately precedes the final polymerization stage and the average polymerization rate during the final polymerization stage where no counter measure has been taken to avoid the polymerization rate increase to occur in the final polymerization stage. Thus, if the final polymerization stage is started at 80%, the polymerization rate increase is determined between the average polymerization rate between the points of 70 and 80% of total addition of TFE and the average polymerization rate in the final stage, i.e., between 80 and 100% of the amount of TFE having been added.

The free radicals capable of introducing ionic end groups or precursors thereof in the polymer PTFE (hereinafter for sake of abbreviation referred to as 'ionic free radicals'), are formed in an amount such that without counter measures, the polymerization rate would increase by at least 20%. While it will generally be preferred to take suitable counter measures to avoid an increase or a too high increase in the polymerization rate, it is contemplated in the present invention to actually allow the polymerization rate to increase, i.e., not taking counter measures that would cause an increase in the polymerization. Counter measures that may be taken to mitigate or completely compensate the increase of the polymerization increase include for example a lowering of the pressure at which TFE is fed to the polymerization or the addition of a perfluorinated comonomer. Suitable perfluorinated comonomers that may be co-fed during the final stage of the polymerization to moderate the otherwise increase in the polymerization rate include perfluorinated vinyl ethers, for example those of the formula:

$$CF_2=CF-O-R_f \quad \text{(II)}$$

wherein $R_f$ represents a perfluorinated aliphatic group that may contain one or more oxygen atoms. Specific examples include perfluoroalkyl vinyl ethers such as perfluoromethyl vinyl ether (PMVE), perfluoroethyl vinyl ether and perfluoro n-propyl vinyl ether (PPVE-1), perfluoro-2-propoxypropylvinyl ether (PPVE-2), perfluoro-3-methoxy-n-propylvinyl ether and perfluoro-2-methoxy-ethylvinyl ether. Preferred perfluoro alkyl vinylethers are gaseous or have a vapor pressure of at least 10 kPa at polymerization temperature. Further examples of suitable perfluorinated comonomers include perfluorinated allyl ethers and perfluorinated olefins having 3 to 8 carbons such as for example hexafluoropropylene. The co-feeding ratio of the perfluorinated comonomer to TFE will generally be selected so as to adjust the polymerization rate to the rate desired. Typically, the co-feeding ratio will be at least 0.015, typically between 0.015 and 0.07 on a molar basis. The co-feeding ratio is defined by the ratio of moles comonomer added to moles of TFE present in the head-space at the start of the final polymerization stage. The perfluorinated monomer may be co-fed continuously or batch-wise. It is generally also possible to counter the polymerization rate increase by adding a chain transfer agent in the final stage of the polymerization. This will however generally not be preferred as a chain transfer agent further lowers the molecular weight of the PTFE in the final polymerization stage without forming ionic end groups or precursors thereof, which is generally undesired. The use of the aforementioned perfluorinated comonomers to counter an increase in the polymerization is most preferred as it has been found that such perfluorinated comonomer further enhances the shear stability of the dispersion when blended with further components to produce a final coating composition.

According to a particular embodiment of the present invention, a perfluorinated co-monomer used in the final polymerization stage may include one or more ionic groups or precursors thereof. Such co-monomers may offer the advantage of substantially further enhancing the stability of the dispersion as they may introduce further ionic groups on the surface of the PTFE particles. Examples of ionic groups in the ionic comonomer include acid groups or salts thereof such as carboxylic acid, sulfonic acid, phosphoric or phosphonic acid and salts thereof. Precursor groups of ionic groups include groups that upon hydrolysis yield an ionic group such as for example esters, which upon hydrolysis yield a carboxylic acid group or a salt thereof, and $SO_2F$ groups that upon hydrolysis yield sulfonic acid groups or salts thereof. Preferably, the ionic comonomer is a perfluorinated monomer including for example a perfluorinated allyl or vinyl ether having one or more ionic groups or precursors thereof.

According to a particular embodiment, the ionic comonomer corresponds to the general formula:

$$CF_2=CF-(-CFX)_s-(OCF_2CFY)_t(O)_h-(CFY')_u-A$$

wherein s is 0 or 1, t is 0 to 3; h is 0 to 1; u is 0 to 12; X represents —F, —Cl or —$CF_3$; Y and Y' independently represent —F or a $C_{1-10}$ perfluoralkyl group; A represents an ionic group or a precursor thereof —CN, —COF, —COOH, —COOR, —COOM, or —COONRR', —$SO_2F$, —$SO_3M$, —$SO_3H$, —$PO_3H_2$, —$PO_3RR'$, —$PO_3M_2$; M represents an alkali metal ion or a quarternary ammonium group; R and R' represent a hydrocarbon group such as e.g. a $C_{1-10}$ alkyl group and R and R' may be the same or different.

According to a further embodiment, the ionic comonomer corresponds to the general formula:

$$CF_2=CF-O-R_f-Z$$

wherein $R_f$ represents a perfluoroalkylene group optionally interrupted by one or more oxygen atoms and Z represents a carboxylic acid group, a salt thereof or a precursor thereof such as an ester of the formula COOR wherein R represents a hydrocarbon group such as an alkyl group or an aryl group, or a sulfonic acid group, a salt thereof or a precursor thereof such as $SO_2F$. In one embodiment, $R_f$ represents a perfluoroalkylene group having between 2 and 8 carbon atoms. Alternatively, $R_f$ may be a perfluoroether group e.g. corresponding to the formula A or B:

$$-(CF_2)_n(O(CF_2)_x)_m(CF_2)_k- \quad \text{(A)}$$

wherein n is an integer of 1 to 6, x is an integer of 1 to 5, m is an integer of 1 to 4 and k is an integer of 0 to 6;

—[CF$_2$CF(CF$_3$)O]$_p$—(CF$_2$)$_q$— wherein p is in an integer of 1 to 3 and q is an integer of 2 to 4.

Specific examples of ionic comonomers include:
CF$_2$=CF—O—(CF$_2$)$_2$—SO$_2$F
CF$_2$=CF—O—(CF$_2$)$_3$—SO$_2$F
CF$_2$=CF—O—(CF$_2$)$_3$—COOCH$_3$
CF$_2$=CF—O—CF$_2$CF(CF$_3$)—O—(CF$_2$)$_2$—COOCH$_3$
CF$_2$=CF—O—CF$_2$CF(CF$_3$)—O—(CF$_2$)$_3$—COOCH$_3$
CF$_2$=CF—O—[CF$_2$CF(CF$_3$)—O]$_2$—(CF$_2$)$_2$—COOCH$_3$
CF$_2$=CF—O—CF$_2$CF(CF$_3$)—O—(CF$_2$)$_2$—SO$_2$F
CF$_2$=CF—O—[CF$_2$CF(CF$_3$)—O]$_2$—(CF$_2$)$_2$—SO$_2$F The ionic free radicals in the final polymerization stage may be formed from any suitable source capable of forming radicals that form ionic end groups or precursors thereof in the PTFE polymer. Preferably, the ionic end groups are groups that are strongly acidic, preferably those that have a pK$_a$ of not more than 3. Examples of such end groups include sulfonic and carboxylic acid groups including salts thereof. These groups have a pK$_a$ of 2 or less. Conveniently, the ionic free radicals are formed from an inorganic initiator or initiator system as described above. For example, free radicals obtained from the thermal decomposition of a persulfate, typically ammonium persulfate (APS), will introduce carboxylic acid groups (—CF$_2$—COOH) and/or salts thereof in the PTFE polymer. When bisulfite as a reducing agent is used, —CF$_2$—SO$_3$H and/or salts thereof are introduced as end groups. The effective amount of ionic end groups needed in accordance with the present invention is so low that the precise amount thereof cannot be reliably quantified by known analytical methods such as infrared analysis or end-group titration. Nevertheless, the effective amount can be indirectly determined by the test method set forth above and illustrated in the examples. In addition to the ionic end groups, also other end groups that may be converted into ionic end groups may form. For example, —COF and —CONH$_2$ end groups may form that can be converted into carboxylic acid end groups or salts thereof through hydrolysis, for example at a basic pH of the dispersion. Such end groups thus represent examples of suitable precursors for ionic end groups.

The ionic free radicals need to be formed in an effective amount in the final stage of the polymerization to cause an increase in polymerization rate by at least 20%, preferably at least 25%, more preferably at least 35% and most preferably at least 40% when no counter measures would be taken to reduce the polymerization rate. The necessary or effective amount of ionic free radicals can be caused in a variety of ways. For example, when an inorganic initiator has been used to initiate the polymerization of PTFE, the rate of decomposition of the inorganic initiator may be increased in the final stage of polymerization by adding a further amount of inorganic initiator, by increasing the polymerization temperature, by adding a reducing agent in case of a redox initiator system such as for example in case of APS by adding a reducing agent such as bisulfite or ADA, by adding a catalyst or by a combination of any of these measures.

The extent to which the temperature needs to be raised or to which extent further initiator amounts or amounts of components that accelerate the decomposition of an inorganic initiator (e.g. reducing agent or catalyst) need to be added to the final stage of the polymerization to achieve an increase of the polymerization rate of at least 20% (absent counter measures) will depend on such factors as the particular polymerization conditions at the point when the measure is taken. Generally, the extent of the measure to be taken to cause the effective amount of ionic free radicals to be formed can be estimated on the basis of the radical flux ratio F defined according to the following equation:

$$F = R_f/R_i \qquad \text{(eq. 1)}$$

wherein $R_i$ is the rate at which free radicals initiating polymerization are generated at the point just before the start of the final polymerization stage (i.e. before the measure is taken) and $R_f$ is the rate at which ionic free radicals are generated in the final polymerization stage (i.e. after the measure has been taken).

When the initiator system used has a long half lifetime that is at least about twice the polymerization time, i.e. time needed to carry out the complete polymerization, F can be calculated or estimated in accordance with one of the following equations if the increase in polymerization rate will be caused by adding further initiator or components thereof:

$$F = m_{Is}/m_{Ik} \qquad \text{(eq. 2)}$$

$$F = (m_{OS} * m_{RS})/(m_{OK} * m_{RK}) \qquad \text{(eq. 3)}$$

$$F = (m_{OS} * m_{RS} * m_{CS})/(m_{OK} * m_{RK} * m_{CK}) \qquad \text{(eq. 4)}$$

In the above equations, m represents the amount of the respective compound indicated by the index character, the first index character indicates the nature of the compound with I representing a single initiator component that decomposes on its own without the addition of other components (e.g. thermally decomposing APS in absence of catalyst or reducing agent), O represents the oxidizing component of a redox system, R represents the reducing agent of a redox system and C represents a catalyst, of the second index character S represents the total amount added during the complete polymerization and K represents the amount added during the final stage of the polymerization. The above equations are valid if a same or similar inorganic initiator system is used in all stages of the polymerization. Equation 2 can be used if the polymerization is carried out using a single initiator component, equation 3 applies if a redox system is used and equation 4 applies if a catalyst is also used. For example, equation 2 can be used when APS is used in all stages of the polymerization and equation 4 may be used with a system comprising APS, bisulfite and a metal catalyst such as copper.

For initiator systems that have a very short half life time such as for example in case of permanganate as the initiator or an initiator system based on APS, ADA and catalysed with cupper ions, it will generally not be possible to calculate the aforementioned radical flux ratio F. In such case, the radical flux ratio F can be estimated as follows. Assuming that with such systems, the initiator or one component thereof, is entirely consumed, the flux ratio is close to the ratio of the consumption of the initiator per kg TFE polymerized before the final polymerization stage to the consumption of initiator or one component thereof per kg TFE polymerized in the final polymerization stage. With regard to a copper catalyzed APS/ADA initiator system, the radical flux ratio F (eq. (1)) thus can be estimated by modifying eq. (4) to $$F = (m_{ADA,O}/M_{p,O} + m_{ADA,fin}/M_{p,fin})/(m_{ADA,O}/M_{p,O}) \qquad \text{eq. (5)}$$

provided that APS is stoichiometrically in excess. In the above equation $m_{ADA,o}$ and $m_{ADA,fin}$ represent respectively the amount of ADA added prior to the final polymerization stage and at the final polymerization stage. The amount of polymer produced before the final polymerization stage is $M_{p,o}$ and at the final polymerization stage is $M_{p,fin}$. The degree of conversion at the start of the final polymerization stage is defined by $M_{p,o}/(M_{p,o}+M_{p,fin})$.

The radical flux ratio may alternatively be determined empirically by measuring $R_i$ and $R_f$ independent of the polymerization but using conditions similar to those existing during the polymerization. Such empirical determination is generally needed if the polymerization rate increase is wholly or partially caused by an increase in polymerization temperature.

The optimal radical flux ratio F to obtain an effective amount of ionic end groups in the PTFE particles generally depends on when the final polymerization stage starts. The later the final polymerization stage starts, and thus the shorter that stage will be, the higher the value F should typically be to obtain an effective amount of ionic end groups. Generally, F should be at least 2, preferably at least 4 when the final polymerization starts at 80% of the amount of TFE having been fed, and at least 3, preferably at least 10 when the final polymerization stage starts at 95%.

Reduction of the Amount of Fluorinated Surfactants

The amount of fluorinated surfactant in an aqueous dispersion of PTFE may be reduced in a number of ways. Generally such methods will require the addition of a stabilizing (non fluorinated) surfactant. This stabilizing non-fluorinated surfactant is typically a non-ionic surfactant although other stabilizing surfactants may be suitable as well depending on the technique used to remove the fluorinated surfactant. Examples of useful non-ionic surfactants include those according to the formula:

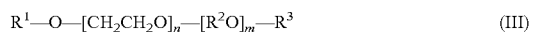

$$R^1\text{—}O\text{—}[CH_2CH_2O]_n\text{—}[R^2O]_m\text{—}R^3 \qquad (III)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$–$C_3$ alkyl group, n has a value of 0 to 40, m has a value of 0 to 40 and the sum of n+m being at least 2. It will be understood that in the above formula (III), the units indexed by n and m may appear as blocks or they may be present in an alternating or random configuration. Examples of non-ionic surfactants according to formula (III) above include alkylphenol oxy ethylates such as ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8. Still further examples include those in which $R^1$ in the above formula (III) represents an alkyl group of 4 to 20 carbon atoms, m is 0 and $R^3$ is hydrogen. An example thereof includes isotridecanol ethoxylated with about 8 ethoxy groups and which is commercially available as GENAPOL®X080 from Clariant GmbH. Non-ionic surfactants according to formula (III) in which the hydrophilic part comprises a block-copolymer of ethoxy groups and propoxy groups may be used and well. Such non-ionic surfactants are commercially available from Clariant GmbH under the trade designation GENAPOL® PF 40 and GENAPOL® PF 80.

According to one embodiment to reduce the amount of fluorinated surfactant, a non-ionic surfactant, e.g. as disclosed above is added to the fluoropolymer dispersion and the fluoropolymer dispersion is then contacted with an anion exchanger. Such a method is disclosed in detail in WO 00/35971.

The anion exchange process is preferably carried out in essentially basic conditions. Accordingly, the ion exchange resin will preferably be in the OH⁻ form although anions like fluoride or sulfate may be used as well. The specific basicity of the ion exchange resin is not very critical. Strongly basic resins are preferred because of their higher efficiency in removing the low molecular weight fluorinated surfactant. The process may be carried out by feeding the fluoropolymer dispersion through a column that contains the ion exchange resin or alternatively, the fluoropolymer dispersion may be stirred with the ion exchange resin and the fluoropolymer dispersion may thereafter be isolated by filtration. With this method, the amount of low molecular weight fluorinated surfactant can be reduced to levels below 150 ppm or even below 10 ppm. Accordingly, dispersions substantially free of fluorinated surfactant may thereby be obtained.

In case the fluorinated surfactant is in its free acid form is steam-volatile, the following method may alternatively be used to reduce the amount of fluorinated surfactant. A steam-volatile fluorinated surfactant in its free acid form may be removed from aqueous fluoropolymer dispersions, by adding a nonionic surfactant to the aqueous fluoropolymer dispersion and, at a pH-value of the aqueous fluoropolymer dispersion below 5, removing the steam-volatile fluorinated surfactant by distillation until the concentration of steam-volatile fluorinated surfactant in the dispersion reaches the desired value as disclosed in DE 100 18 853. Fluorinated surfactants that can be removed with this process include for example the surfactants according to formula (I) above.

Still further, the amount of fluorinated surfactant may be reduced to the desired level through the use of ultrafiltration as disclosed in U.S. Pat. No. 4,369,266. Generally, this method will simultaneously also increase the solids amount of the dispersion and thus may be used to simultaneously remove the fluorinated surfactant and upconcentrate the dispersion.

Upconcentration

Generally subsequent to reducing the level of fluorinated surfactant the aqueous dispersion may be upconcentrated if the resulting PTFE solids are lower than desired. It is however also possible to reduce the amount of fluorinated surfactant in an upconcentrated dispersion or simultaneously with the upconcentration as described above. To increase the amount of fluoropolymer solids, any suitable or known upconcentration technique may be used. These upconcentration techniques are typically carried out in the presence of a non-ionic surfactant which is added to stabilize the dispersion in the upconcentration process. The amount of non-ionic surfactant that should generally be present in the dispersion for upconcentration is typically between 2% by weight and 15% by weight, preferably between 3% by weight and 10% by weight. Suitable methods for upconcentration include ultrafiltration, thermal upconcentration, thermal decantation and electrodecantation as disclosed in GB 642,025.

The method of ultrafiltration comprises the steps of (a) adding non-ionic surfactant to a dispersion that desirably is to be upconcentrated and (b) circulating the dispersion over a semi-permeable ultra-filtration membrane to separate the dispersion into a fluorinated polymer dispersion concentrate and an aqueous permeate. The circulation is typically at a conveying rate of 2 to 7 meters per second and affected by pumps, which keep the fluorinated polymer free from contact with components, which cause frictional forces.

To increase the fluoropolymer solids in the aqueous dispersion, thermal decantation may also be employed. In this method, a non-ionic surfactant is added to the fluoropolymer dispersion that is desirably upconcentrated and the dispersion is then heated so as to form a supernatant layer that can be decanted and that typically contains water and some non-ionic surfactant while the other layer will contain the concentrated dispersion. This method is for example disclosed in U.S. Pat. No. 3,037,953 and EP 818506.

Thermal upconcentration involves heating of the dispersion and removal of water under a reduced pressure until the desired concentration is obtained.

Aqueous PTFE Dispersion

The method of the invention will typically result in an aqueous PTFE dispersion that is free of fluorinated surfactant or contains the latter in an amount of not more than 200 ppm, preferably not more than 100 ppm, more preferably not more than 50 ppm and most preferably not more than 20 ppm based on the PTFE solids in the dispersion. The dispersion will typically also contain a non-ionic surfactant. The amount thereof should generally be between 2 and 15% by weight based on the weight of PTFE solids, preferably between 3 and 12% by weight. The amount of non-ionic surfactant may result from the amount of stabilizing surfactant used during the removal of the fluorinated surfactant and/or during the optional upconcentration of the dispersion. But the amount of non-ionic surfactant may be adjusted by adding further non-ionic surfactant to achieve a desired level of non-ionic surfactant within the aforementioned range in the dispersion. The dispersion should typically have a amount of PTFE solids in the range of 30 to 70% by weight, preferably between 40 and 65% by weight so as to make the dispersion most suitable for combination with further components to produce a final coating composition for coating substrates such as for example metal.

The PTFE particles resulting from the method of the invention have an effective amount of ionic end groups such that a dispersion having a composition and conductivity as described above and tested under the conditions as described above has a shear stability of at least 3 minutes when the average particle diameter of the particles is 150 nm or more and at least 4 minutes when the average particle diameter is less than 150 nm. It has been found that PTFE dispersion of which at least part of the PTFE particles meet this requirement, can be used to formulate final coating compositions that can be used in existing coating equipment without the risk or with a reduced risk for clogging of spray heads or without the risk or with a reduced risk of coagulation in pumping systems used. Generally the risk of coagulation is reduced sufficiently such that coagulation in a practical application would not occur or not impair the coating process. Preferably at least 30% by weight of the total amount of PTFE particles, more preferably at least 50% by weight and most preferably at least 80% by weight or all of the PTFE particles are PTFE particles having the effective amount of end groups.

The PTFE dispersion may contain a mixture of PTFE particles of different average particle size, i.e., the particle size distribution of the PTFE particles can be bimodal or multi-modal as disclosed in e.g. U.S. Pat. No. 5,576,381 and EP 969 055. Multi-modal PTFE particle dispersions may present advantageous properties. For example, the PTFE dispersion may comprise a mixture of first PTFE particles having an average particle size of at least 180 nm in combination with second PTFE particles that have an average particle size volume average particle diameter) of not more than 0.7 times the average particle size of the first PTFE particles as disclosed in U.S. Pat. No. 5,576,381. Bimodal or multi-modal PTFE dispersions can be conveniently obtained by blending the aqueous PTFE dispersion of different PTFE particle size together in the desired amounts. It will generally be preferred that the individual PTFE dispersion used to obtain a multi-modal or bimodal PTFE dispersion have been prepared according to the aqueous emulsion polymerization process described above. In particular at least the small PTFE particles, having for example an volume average particle diameter of 50 to 200 nm, in a bimodal or multi-modal dispersion should be prepared according to the aqueous emulsion polymerization process described above as it has been found that these particles have the largest impact on the problems encountered during preparation and use of a final coating composition. Preferably the individual dispersions already are free of fluorinated surfactant or contain a reduced amount thereof. It is however also possible to reduce the amount of fluorinated surfactant subsequent to mixing the dispersions together.

Additionally, the PTFE dispersion may be mixed with aqueous dispersions of other fluoropolymers, in particular melt-processible fluoropolymers. Suitable dispersion of melt-processible fluoropolymers that can be mixed with the PTFE dispersion include dispersions of the following fluoropolymers: copolymers of TFE and a perfluorinated vinyl ether (PFA) and copolymers of TFE and HFP (FEP). Such dispersions may be monomodal, bi-modal or multimodal as disclosed in e.g. EP 990 009.

The PTFE dispersion preferably has a conductivity of at least 500 μS, typically between 500 μS and 1500 μS. When the conductivity is too low, the shear stability may be reduced. The desired level of conductivity of the dispersion may be adjusted by adding a salt thereto such as for example a simple inorganic salt such as sodium chloride or ammonium chloride and the like. Also, the level of conductivity may be adjusted by adding an anionic non-fluorinated surfactant to the dispersion as disclosed in WO 03/020836.

Generally preferred anionic non-fluorinated surfactants are surfactants that have an acid group that has a pKa of not more than 4, preferably not more than 3. It was found that such anionic surfactants in addition to controlling the viscosity are generally also capable of increasing the stability of the fluoropolymer dispersion. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups, or groups such as such as an amino groups. Nevertheless, when amino groups are contained in the surfactant, the pH of the dispersion should be such that the amino groups are not in their protonated form. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulphonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as, for example, oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Emulsogen™ LS (sodium lauryl sulfate) and Emulsogen™ EPA 1954 (mixture of C12 to C14 sodium alkyl sulfates) available from Clariant GmbH and TRITON™ X-200 (sodium alkylsulfonate) available from Union Carbide. Preferred are anionic hydrocarbon surfactants having a sulfonate group.

Further optional components that may be present in the aqueous PTFE dispersion include buffering agents and oxidizing agents like $KClO_3$ as required or desired for the various applications.

The PTFE dispersions of the present invention can be used to produce final coating compositions for coating various substrates such as metal substrates, e.g. cookware, fabrics such as glass fiber based fabrics, which may be used as architectural fabrics. Generally, the PTFE dispersions will be blended with further components typically used to produce a final coating composition. Such further components may be dissolved or dispersed in an organic solvent such as toluene, xylene and the like. Typical components that are used in a final coating composition include heat resistant polymers such as polyamide imide, polyimide or polyarylen sulphide. Still further ingredients such as pigments and mica particles may be added as well to obtain the final coating composition. The PTFE dispersions typically represent about 10 to 80% by weight of the final composition. Details on coating compositions for metal coatings and components used therein have been described in e.g. WO 02/78862, WO 94/14904, EP 22257 and U.S. Pat. No. 3,489,595.

EXAMPLES

The invention is further described without however the intention to limit the invention thereto.

Methods

Determination of Solid Content and Nonionic Emulsifier

Both quantities are gravimetrically determined according to ISO 12086. Values of nonionic emulsifier content given in the examples are based on solids content and are accurate to ±5%. The solids content of the upconcentrated dispersion shown in the examples is 58%+1%. Correction for not volatile inorganic salts was not considered.

Particle Size

Particle size of the PTFE particles was measured via inelastic light scattering using a Malvern 1000 HAS Zetasizer. The average particle size is reported as the volume average diameter.

Determination of APFOA

APFOA-content is determined via gaschromatography of the methyl ester using an internal standard, e.g. the methyl ester of perfluoro decanoic acid. To quantitatively convert APFOA to the methyl ester, 200 µl dispersion are treated with 2 ml methanol and 1 ml acetylchloride in presence of 0.3 g $MgSO_4$ for 1 hour at 100° C. The formed methyl ester is extracted with 2 ml hexane and subjected to gaschromatography analysis. Detection limit is <5 ppm. The amounts of APFOA reported in the examples are based on solids of the dispersion.

Conductivity

Conductivity was measured with the 712 Conductometer, supplied by Metrohm AG. In case that the conductivity of the upconcentrated dispersions was less than 1000 µS/cm, aqueous ammonium sulfate solution (1%) was added to adjust the conductivity to about 1000 µS/cm.

Polymerization

A stainless steel 150 l polymerization vessel equipped with a 3 finger paddle-agitator and baffles was used. Agitation speed was generally about 210 rpm and kept constant during the polymerization. The polymerization rate was measured via the flow of TFE into the reactor. The average polymerization rate was in the range of 12 to 16 kg/hours. The displacement of TFE from the vapor space by the volume of formed polymer was not taken into account. Temperature and TFE pressure was kept constant during polymerization.

Shear Stability Test 150 g dispersion, thermostated to 20° C., were put in a 250 ml standard glass beaker of an inner diameter of 65 mm. The agitation head (S 25 N–25 G) of an Ultra Turrax T25, supplied by Janke & Kunkel, was immersed in the center of the beaker such that the end of the head was 7 mm above the beaker bottom. The Ultra Turrax was switched on at a revolution speed of 8000 rpm. Agitation rendered the surface of the dispersion "turbulent" or "wavy". After 10 to 20 sec, 2.0 g xylene were added dropwise within less than 10 sec to the agitated dispersion. Time measurement started with the addition of xylene and was stopped when the surface of the agitated dispersion no longer showed visible turbulence. The surface "freezes" or smoothes due to coagulation. Coagulation was accompanied by a characteristic change of sound of the Ultra Turrax. In case that the "surface freezing" could not be clearly observed due to foam formation time measurement was stopped with the onset of the change of sound. Reported shear stability values in the examples are the average of 5 measurements. Observed reproducibility was 10%.

Removal of Fluorinated Surfactant: Ammonium Perfluorooctanoic Acid (APFOA)

The dispersions as obtained from the polymerization are called raw dispersions. To the raw dispersions were added 2% Triton® X 100 based on weight of solids. 100 ml of anion exchange resin Amberlite® IRA 402 in the OH⁻ form were added to 1 l raw dispersion. The mixture was gently agitated for 12 hour and the exchange resin was filtered off via a glass sieve.

Upconcentration

If necessary the conductivity of the APFOA-reduced dispersions was adjusted to a conductance of 500 µS/cm by adding a 1% aqueous ammonium sulfate solution. They then were thermally up-concentrated via evaporation to a solid content of 58% in presence of Triton® X 100 (supplied by Dow Chemical) as the non-ionic surfactant. The amount of the non-ionic surfactant was 5% based on the total amount of solids. If necessary, pH was adjusted to at least 9 by adding aqueous ammonia (25%) and the conductivity adjusted to about 1000 µS/cm by adding aqueous ammonium sulfate solution (1%). The thus up-concentrated dispersions were subjected to the shear test described above.

Example 1

Comparative 100 l deionized water containing 200 g ammonium perfluoro octanoate (APFOA) were charged in a 150 l polymerization vessel. Air was removed by alternating evacuation and pressurizing with nitrogen up to 6 bar. Then 140 g HFP were fed in the vessel. The temperature in the vessel was adjusted to 35° C. The vessel was pressurized with TFE to 15 bar (abs.). Then 100 ml deionized water containing 1.1 g APS, 50 g 25% ammonia solution and 60 mg $CuSO_4.5 H_2O$ were pumped in the vessel. The polymerization was started by quickly pumping 150 ml deionized water containing 0.5 g $Na_2S_2O_5$ in the vessel. Polymerization temperature and pressure were kept constant. Uptake rate of TFE was adjusted to about 12 kg/h by properly adjusting the speed of agitation. When 11 kg TFE were consumed, polymerization was stopped by closing the TFE-feeding and lowering the speed of agitation. The vessel was vented and the resulting dispersion discharged. The thus obtained dispersion had a solid content of 10% and particle size of about 100 nm. This dispersion is called in the following "seed latex".

APFOA was removed via anion exchange and the dispersion thermally upconcentrated. The final upconcentrated dispersion had a solid content of 57.8% and a Triton® X 100 content of 4.8% based on solids. APFOA content was 5 ppm. Adjusted conductivity was 1100 μS/cm. The dispersion had a shear stability of 2:15 min.

Example 2

The polymerization was conducted as described in Example 1 with the following difference. When 11 kg TFE are consumed, a solution containing 1.0 g APS, 60 mg $CuSO_4 5 H_2O$ and 5.0 g 25% aqueous ammonia solution in 150 ml deionized water was pumped into the vessel followed by a solution of 0.5 g $Na_2S_2O_5$ in 150 g deionized water. The radical flux ratio according to eq. 4 above was about 8. Polymerization rate increased instantly. When the increase reached 90%, 200 g HFP were injected in the vessel (Molar ratio: 0.04). When a total amount of 12 kg TFE was consumed polymerization was stopped by closing the TFE-feeding and lowering the speed of agitation. The final polymerization stage thus was started at 91.6% conversion of TFE. The vessel was vented and the resulting dispersion discharged. The thus obtained dispersion had a solid content of 10.5% and particle size of about 95 nm. This dispersion is called in the following "stabilized seed latex".

APFOA was removed by anion exchange and the dispersion thermally upconcentrated. Conductivity was adjusted with an aqueous ammonium sulfate solution. The final upconcentrated dispersion had a solid content of 58.1% and a Triton® X 100 content of 5.0% based on solids. APFOA content was about 10 ppm. Conductivity was 1300 μS/cm. The dispersion had a shear stability of 7:11 min.

Example 3

Comparative 21 kg seed latex prepared as described in Example 1 are charged in a 150 l polymerization vessel together with 80 l deionized water containing 100 g APFOA. Air was removed as described in Example 1. The vessel was pressurized with TTE to 15 bar abs. and the temperature adjusted to 42° C. Polymerization was conducted at constant pressure and temperature and agitating speed of 210 rpm. 200 ml aqueous solution containing 0.6 g APS, 60 mg $CuSO_4. 5 H_2O$ and 50 g 25% aqueous ammonia solution were charged into the vessel. Polymerization was initiated by continuously pumping in the vessel an aqueous solution containing 0.15 g azodicarboxyl diamide (ADA) dissolved in 3 l deionized water containing 50 ml 10% NaOH. The ADA solution had a concentration of 0.05 g ADA/l. Pumping rate for the first 10 min was 50 ml/min and then lowered to 15–30 ml/min. Feeding rate was adjusted to achieve an uptake rate for TFE of about 12 kg/h. When 22 kg TFE were consumed a total amount of 0.10 g ADA had been fed to vessel. Polymerization was stopped by interrupting the feeding of the ADA-solution and TFE. Interrupting the ADA feeding resulted in a rapid decrease of the polymerization rate. The vessel was vented and the dispersion was discharged.

The so obtained raw dispersion had a solid content of about 19.5 wt-% and a particle size of 220 nm.

APFOA was removed by anion exchange and the dispersion thermally upconcentrated as described above. Conductivity was adjusted to 1100 μs/cm with ammonium sulfate and pH-value to 9 with conc. aqueous ammonia solution. The final upconcentrated dispersion had a solid content of 57.9% and a Triton® X 100 content of 5.0% based on solids. APFOA-content was about 20 ppm. The dispersion showed a shear stability of 1:15 min.

Example 4

Polymerization was carried out as described in Example 3 but at a total consumption of 22 kg TFE feeding of ADA was stopped and a solution containing 0.8 g APS, 60 mg $CuSO_4 5 H_2O$ and 50 g 25% aqueous ammonia solution in 150 ml deionized water was quickly charged into the vessel followed by a solution of 0.6 g $Na_2S_2O_5$ in 50 ml deionized water. Polymerization rate increased instantly. When polymerization rate had increased by 70%, 200 g HFP were injected in the polymerization vessel. The molar HFP/TFE ratio was 0.04. When a total amount of 23 kg TFE was consumed, polymerization was stopped by closing the TFE-feeding. The final polymerization stage thus started at 95.6% conversion of TFE. The vessel was vented and the dispersion discharged. The so-obtained raw dispersion had a solid content of 20% and a particle size of 220 nm.

The raw dispersion was treated as described in Example 3 to yield a dispersion of a solid content of 58.3% and a conductivity of 1300 μS/cm with a Triton® X-100 content of 5.2% based on solids. APFOA-content was about 10 ppm. The dispersion had a shear stability of 5:10 min.

Example 5

Example 4 was repeated but instead of using 21 kg seed latex of example 1, 38 kg of the seed latex of example 1 and 63 l deionized water were charged in the vessel. The raw dispersion had a solid content of 20.5% and a particle size of 180 nm. The APFOA content was reduced and the raw dispersion was upconcentrated to yield a dispersion of a solids content of 58.1%, a conductivity of 1200 μS/cm and an APFOA-content of 8 ppm. The amount of Triton® X-100 was 4.9%. The upconcentrated dispersion had a shear stability of 5:40 min.

Example 6

Example 4 was repeated with the difference that at the final stage 0.1 g APS, 60 mg $CuSO_4 \cdot 5\ H_2O$ and 50 g 25% aqueous ammonia solution in 150 ml deionized water was quickly charged into the vessel followed by a solution of 0.075 g $Na_2S_2O_5$ in 50 ml water deionized. The polymerization rate increased instantly up to 20%. When 0.5 kg TFE were consumed, 200 g HFP were fed in the vessel and the polymerization was stopped after a further 0.5 kg TFE was consumed. The final polymerization stage was started at 95.6% conversion. The raw dispersion had a solid content of 20%. Particle size was 220 nm. The APFOA content was reduced and the raw dispersion was upconcentrated to yield a dispersion of a solid contents of 58.0%, a Triton® X-100 content of 5.1%, and an APFOA-content of 12 ppm, and an adjusted conductivity of 1200 µS/cm. This dispersion had a shear stability of 3:07 min.

Example 7

Example 6 was repeated with the difference that at the final stage 0.15 g APS, 60 mg $CuSO_4 \cdot 5\ H_2O$ and 50 g 25% aqueous ammonia solution dissolved in 150 ml deionized water was quickly charged into the vessel followed by a solution of 0.1 $Na_2S_2O_5$ in 50 ml deionized water. An increase of polymerization rate of up to 35% was observed before the addition of HFP. The final polymerization stage was started at 95.6% conversion. The raw dispersion had a solid content of 20%. Particle size was 220 nm.

The APFOA content was reduced and the raw dispersion was upconcentrated to yield a dispersion having a solids content of 58.3%, a Triton® X 100 content of 5.2 and an APFOA-content of 5 ppm. Conductivity was adjusted to 1000 µS/cm. The dispersion had a shear stability of 3:30 min.

Example 8

Example 6 was repeated with the difference that at the final stage 0.3 g APS, 60 mg $CuSO_4 \cdot 5\ H_2O$ and 50 g 25% aqueous ammonia solution dissolved in 150 ml deionized water was quickly charged into the vessel followed by a solution of 0.2 $Na_2S_2O_5$ dissolved in 50 ml deionized water. An increase of the polymerization rate up to 60% was observed before the addition of HFP. The final polymerization stage was started at 95.6% conversion. The APFOA content was reduced and the raw dispersion was upconcentrated to yield a dispersion with a solid content of 57.8%, Triton® X 100 content of 5.0%, and APFOA-content of about 9 ppm. Adjusted conductivity was 1000 µS/cm. This dispersion had a shear stability of 4:43 min.

Example 9

Example 8 was repeated with the difference that the final polymerization stage was started when 21 kg TFE had been consumed, that is when 91.3% of TFE had been added. A solution containing 0.2 g APS, 60 mg $CuSO_4 \cdot 5\ H_2O$ and 50 g of a 25% aqueous ammonia dissolved in 150 ml deionized water was quickly charged into the vessel followed by a solution of 0.12 g $Na_2S_2O_5$ dissolved in 50 ml deionized water. Polymerization rate increased instantly by 35%. Then 80 g HFP were injected. The molar HFP/TFE ratio was 0.016. Polymerization was stopped when a total amount of 23 kg TFE was consumed. The APFOA content was reduced and the raw dispersion was upconcentrated to yield a dispersion with a solid content of 58.1%, a Triton® X 100 content of 5.2% and an APFOA content of 7 ppm. Particle size was 220 nm. Adjusted conductivity was 900 µS/cm. The shear stability was 4:40 min.

Example 10

Example 8 was repeated with the difference that the final stage was introduced when 19 kg TFE had been consumed, i.e. when 82.6% of the total amount of TFE had been fed. A solution containing 0.12 g APS, 60 mg $CuSO_4 \cdot 5\ H_2O$ and 50 g of 25% aqueous ammonia dissolved in 150 ml deionized water was quickly charged into the vessel followed by a solution of 0.1 g $Na_2S_2O_5$ dissolved in 50 ml deionized water. Polymerization rate increased instantly by 25%. Then 40 g HFP were injected. The molar HFP/TFE ratio was 0.008. Polymerization was stopped when a total amount of 23 kg TFE was consumed. The APFOA content was reduced and the raw dispersion was upconcentrated to yield a dispersion with a solid content of 58.0%, a Triton® X 100 content of 5.0% and an APFOA content of 10 ppm. Particle size was 220 nm. Adjusted conductivity was 1200 µS/cm. Shear stability was 4:15 min.

Example 11

Polymerization was conducted as described in Example 3 with the following differences. When 22 kg TFE were consumed, about 0.12 g ADA had been fed to the vessel. Then 200 ml APS solution containing 2.1 g APS was quickly fed in the vessel. Polymerization rate did not increase. This is an indication that APS does not effectively initiate the polymerization at the polymerization temperature of 42° C. Then 200 ml ADA solution containing 0.08 g ADA dissolved in 50 ml 10% NaOH were quickly pumped in the vessel. Polymerization rate increased instantly up to 72%. Then 200 g HFP were charged to the vessel. Polymerization was stopped when a total amount of 23 kg TFE were consumed. The final polymerization stage was started at 95.6% conversion and the radical flux ratio F according to equation 5 above was 15.6. A raw dispersion of a solid content of 19.5% was obtained. Particle size was 220 nm.

The APFOA content was reduced and the raw dispersion was upconcentrated to yield a dispersion with a solid content of 57.8%, a Triton® X 100 content of 5% and an APFOA-content of 15 ppm and adjusted conductivity of 1100 µS/cm. The dispersion had a shear stability of 4:25 min.

Example 12

Example 9 was repeated with the difference that at the final polymerization stage, the 200 ml ADA solution injected contained 0.025 g ADA. Polymerization rate increased instantly by 35%. Then 200 g HFP were charged to the vessel. Polymerization was stopped when a total amount of 23 kg TFE were consumed. The final polymerization stage started when 95.6% of the total TFE amount had been added. 0.12 g ADA were fed in the vessel before the final stage. The radical flux-ratio F according to equation 5 is 5.6. A raw dispersion of a solid content of 19.8% was obtained. Particle size was 220 nm. The up-concentrated dispersion had a solid content of 58.0%, a Triton® X 100 content of 5.2%, an APFOA-content of 8 ppm and an adjusted conductivity of 1200 µS/cm. The dispersion showed a shear stability of 3:28 min.

Example 13

10 kg of the dispersion of Example 1 containing 2% Triton® X 100 based on solids were blended with 46 kg of the dispersion of Example 4 also containing 2% Triton® X 100 and upconcentrated to yield a dispersion with a solid content of 57.8%, a Triton® X 100 content of 5.2% and an APFOA-content of 25 ppm. Conductance was adjusted to 1000 μS/cm. The dispersion had a shear stability of 3:51 min.

Example 14

A bimodal dispersion was prepared as described in Example 13 with the difference that the "stabilized seed latex" of Example 2 was used instead of the seed latex of Example 1. The final dispersion had an APFOA content about 15 ppm, a solid content of 58.0% and a conductance of 1200 μS/cm. The dispersion had a shear stability of 7:57 min.

Example 15

Comparison between the PTFE-dispersion of example 4 with the dispersion of comparative Example 3 in respect of some end-use properties in metal coating.

Two layers, "Prime coat" and "Top Coat" were produced by spraying the formulated Prime and Top coat on degreased aluminum Plates, so-called Panels (10×10 cm). Each layer was separately produced by drying in an infrared dryer at about 100° C. for 15 minutes. The dry film thickness of each layer was about 20 μm. Prime coat and top coat were cured together at 400° C. for 5 minutes. The composition of the "formulation batch" is given in Table 1. The Prime coat contained 40 wt %, the Top coat 80 wt % PTFE-dispersion. The coated aluminum panels were subjected to various tests well known in the art as listed in table 2 for the inter coat and the prime coat. The tests were conducted according to British Standard Specification for Cookware BS7069:1988.

TABLE 1

Composition of "Formulation Batch"

| Component | parts in weight |
| --- | --- |
| PAI-Trion resin 9020, Hoechst AG aqueous solution, solid content 15 wt % (PAI = Polyamidimide) | 56.3 |
| Titandioxide P522, Sachtleben Chemie aqueous dispersion, solid cont. 45 wt % particle size: 250 nm | 16.9 |
| Printex 200, Degussa, Carbon Black pigment aqueous dispersion, solid cont. 25 wt % particle size: 50 nm | 11.3 |
| Levasil-Silicagel 200 A, Bayer AG 30 wt % solid content, particle size 15–20 nm | 4.2 |
| Triethanolamine | 4.2 |
| Triton ®X 100 | 1.4 |
| Xylene | 5.7 |
|  | 100.0 |

TABLE 2

| | Inter coat *) | | | Prime coat *) | | | |
| --- | --- | --- | --- | --- | --- | --- | --- |
| | Cross batch | water-cooking | saltwater cooking | cross batch | water cooking | saltwater cooking | pen ball +) ++) |
| Ex. 3 | 4 | 5 | 5 | 0 | 1 | 3 | 2–3 |
| Ex. 4 | 1 | 0 | 5 | 0 | 0 | 1 | 3 |

*) Rating: 0 = excellent, 5 = poor
+) Rating: 0 = poor, 9 = excellent
++) Pen ball test was conducted close to procedure described in WO 02/14065-A1; PCT/US01/41760.

As one can readily see from the test-results, the PTFE-dispersion according to the invention appears to exhibit no deterioration but rather discernible improvements with regard to end-use properties.

What is claimed is:

1. Method of making an aqueous dispersion of non-melt processible polytetrafluoroethylene, the method comprising:
    (a) an aqueous emulsion polymerization of an amount of tetrafluoroethylene to produce a final amount of polytetrafluoroethylene solids and optionally up to 1% by weight based on the amount of tetrafluoroethylene of a perfluorinated comonomer, wherein said aqueous emulsion polymerization is initiated with a free radical initiator and the polymerization is carried out in the presence of a fluorinated surfactant, and wherein before completing the feeding of said amount of tetrafluoroethylene but after feeding at least 80% by weight of said amount of tetrafluoroethylene, free radicals capable of introducing ionic end groups or precursors thereof in the polytetrafluoroethylene polymer are caused to be formed at a rate that without counter measures would cause an increase in the polymerization rate of at least 20%;
    (b) reducing the amount of fluorinated surfactant in the thus obtained aqueous dispersion to an amount of not more than 200 ppm based on the amount of polytetrafluoroethylene solids.

2. Method according to claim 1 wherein the amount of fluorinated surfactant is reduced by contacting the aqueous dispersion in the presence of a non-ionic surfactant with an anion exchange resin.

3. Method according to claim 1 wherein the formation of said free radicals capable of introducing ionic end groups or precursors thereof in the polytetrafluoroethylene polymer is caused by at least one of increasing the polymerization temperature, addition of an inorganic initiator and addition of one or more inorganic components of an initiator system.

4. Method according to claim 1 wherein said ionic groups are acid groups having a $pK_a$ of not more than 3 or salts of said acid groups.

5. Method according to claim 1 wherein during formation of said ionic groups or precursors thereof, a perfluorinated comonomer is co-fed with tetrafluoroethylene to the polymerization.

6. Method according to claim 5 wherein said perfluorinated comonomer is selected from hexafluoropropylene, a perfluorovinyl ether or a perfluoroallyl ether.

7. Method according to claim 1 wherein the polymerization is conducted under conditions such that at least 90% by weight of polytetrafluoroethylene particles obtained after step (a) are spherical.

8. Method according to claim 1 wherein the method further comprises upconcentrating the resulting aqueous dispersion to a polytetrafluoroethylene solids amount between 30% and 70% by weight, said upconcentration being carried out in the presence of a non-ionic surfactant.

9. Method according to claim 1 wherein the aqueous emulsion polymerization is carried out under conditions so as to produce polytetrafluoroethylene particles having a volume average particle size between 50 nm and 350 nm.

* * * * *

UNITED STATES PATENT AND TRADEMARK OFFICE
CERTIFICATE OF CORRECTION

PATENT NO.        : 7,041,728 B2
APPLICATION NO. : 10/962633
DATED             : May 9, 2006
INVENTOR(S)       : Tilman Zipplies It is certified that error appears in the above-identified patent and that said Letters Patent is hereby corrected as shown below:

Title page,
Column First Page Col. 2 (U.S Patent Documents) – Line 2 - Delete "6,825,250 B1" and insert -- 6,825,250 B2 --, therefor.

Column 4 – Line 10 - delete "$10^{10}$ Pa·s." and insert --$10^{10}$ Pa.s.--, therefor.

Column 4 – Line 59 (Approx.) - After "exceed" insert -- 1% by weight of the total amount of monomer feed. If the amount would be more than --.

Column 4 – Line 60-61 - Delete "ISO 12068" and insert -- ISO 12086 --, therefor.

Column 5 – Line 34 - Delete "ammonium, alkali" and insert -- ammonium-,alkali-, --, therefor.

Column 10 – Line 62-65 - Delete "With regard……………….eq. (4) to" and insert the same in line 63 (Approx.) as a new paragraph.

Column 10 – Line 66 - Delete "eq.(5)" and insert -- (eq. 5) --, therefor.

Column 15 – Line 54 - Delete "58%+1%" and insert -- 58%± 1%. --, therefor.

Column 16 – Line 26 - Delete "themmostated" and insert -- thermostated --; therfor.

Column 17 – Line 8 - Delete 100 1" and insert -- 1001 --, therefor.

Column 17 – Line 15-16 - Delete "$CuSO_4.5H_2O$" and insert -- $CuSO_4$•5 $H_2O$ --, therefor.

Column 18 – Line 3 - Delete "TTE" and insert -- TFE --, therefor.

Column 18 – Line 12 - Delete "ADA/I" and insert -- ADA/1 --, therefor.

Column 18 – Line 25 (Approx.) - Delete "1100 μs" and insert -- 1100 μS --, therefor.

Column 19 – Line 4 - Delete "$CuSO_4.5$ $H_2O$" and insert -- $CuSO_4$• 5 $H_2O$ --, therefor.

Column 19 – Line 23 - Delete "$CuSO_4.5$ $H_2O$" and insert -- $CuSO_4$• 5 $H_2O$ --, therefor.

Column 19 – Line 41 - Delete "$CuSO_4.5$ $H_2O$" and insert -- $CuSO_4$• 5 $H_2O$ --, therefor.

Column 19 – Line 59 - Delete "$CuSO_4.5$ $H_2O$" and insert -- $CuSO_4$• 5 $H_2O$ --, therefor.

UNITED STATES PATENT AND TRADEMARK OFFICE
CERTIFICATE OF CORRECTION

PATENT NO.         : 7,041,728 B2
APPLICATION NO. : 10/962633
DATED              : May 9, 2006
INVENTOR(S)        : Tilman Zipplies It is certified that error appears in the above-identified patent and that said Letters Patent is hereby corrected as shown below:

Column 20 – Line 12 - Delete "$CuSO_4.5\ H_2O$" and insert -- $CuSO_4 \bullet 5\ H_2O$ --, therefor.

Signed and Sealed this

Twenty-eighth Day of November, 2006

JON W. DUDAS
*Director of the United States Patent and Trademark Office*